RECORD RETRIEVAL CONTROL UNIT

Filed April 7, 1965 2 Sheets-Sheet 1

INVENTOR
JAMES R. EVANS
BY Ronald J. Clark
ATTORNEY

United States Patent Office 3,348,213

Patented Oct. 17, 1967

3,348,213

RECORD RETRIEVAL CONTROL UNIT

James R. Evans, Endicott, N.Y., assignor to International Business Machines Corporation, Armonk, N.Y., a corporation of New York

Filed Apr. 7, 1965, Ser. No. 446,238
20 Claims. (Cl. 340—172.5)

ABSTRACT OF THE DISCLOSURE

This invention is directed to a record retrieval control unit which reduces the rotational delay experienced by state of the art random access disc storage units. This delay is reduced in a unit having a plurality of records on a track by the immediate transfer to a buffer storage unit of the first integral record found on the track. The remaining records are transferred sequentially. A wait for the home address or other artificial starting positions is avoided.

Figure 1A:
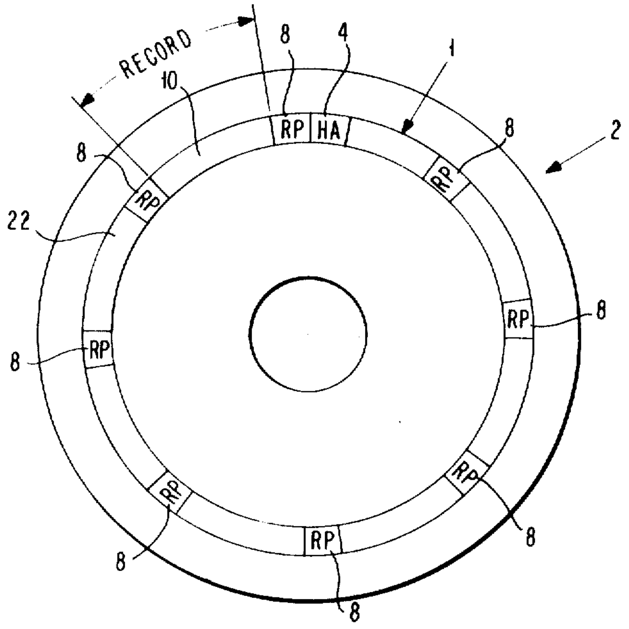

This invention relates generally to storage control circuits and more particularly, to a record retrieval control circuit employed intermediate a data processor and a random access storage system.

Data processing systems employ a plurality of input equipments as a means of supplying records to an associated processor. A major effort in the control circuit area has been expended on the solution of the basic problem of releasing the processor for further work while a record is being retrieved. Presently, the processor is tied up during the record retrieval operation when it exerts a continuing control over the record retrieval operation. A control system constructed according to the instant invention ties up its associated processor only during the actual transfer of a retrieval command. Immediately thereafter, the processor performs other work, while the control system supervises the actual retrieval of the record.

Additionally, a large disparity of operating speeds is common between a processor and its random access storage units. Considerable circuitry is normally required to provide transmission rate compatibility between these units. However, a control unit practicing the present invention does not require this added circuitry. The unit is able to transfer the data at rates compatible with both the slower random access storage unit and the faster processor.

Normally, a random access storage unit is subdivided into many small addressable storage areas. Well known random access storage units are disc packs, film strips and film cartridges. A system employing a disc storage unit has been selected as a representative system which practices the present invention. Each of these areas contain control and timing signals in addition to data signals. These timing and automatic gain control (AGC) signals are quite extensive and use up a portion of the area available for the storage of data signals. A percentage of the storage area used by these signals may reach as much as thirty-five percent of all available areas on the disc.

The random access storage unit operating in combination with a control unit practicing the instant invention has a maximum area available for the storage of data signals, since timing and AGC signals are not employed.

It is an object of the instant invention to provide a record retrieval control system which is capable of releasing the processor immediately after receiving a record retrieval control signal.

It is a further object of the instant invention to provide a record retrieval control system employing a magnetic core storage unit for storing the contents of an entire disc track.

It is another object of the instant invention to provide a record retrieval control system including a recording disc employing a track format comprising a single track address, a plurality of records, and a record pulse between each adjacent record.

It is a further object of the instant invention to provide a record retrieval control circuit which does not require a large percentage of timing signals to control the transfer of a record between a disc file and its associated processor.

It is a still further object of the instant invention to provide a record retrieval control circuit capable of transferring records to an associated processor at processor rates without the need of extensive retiming circuits.

It is another object of the instant invention to provide a record retrieval control circuit which initiates reading from an associated disc surface with a minimum of rotational delay.

It is a further object of the instant invention to provide a record retrieval control circuit which selects a single record from a plurality of records on a track by address decoding.

It is another object of the instant invention to provide a record retrieval control circuit which selects a single record from a plurality of records on a track by key comparing.

It is a still further object of the instant invention to provide a record retrieval control circuit which retrieves an identified record from a bulk storage unit and transfers the identified record to the associated processor by a magnetic core memory.

The foregoing and other objects, features and advantages of the invention will be apparent from the following more particular description of preferred embodiments of the invention, as illustrated in the accompanying drawings; wherein—

Figure 1B:
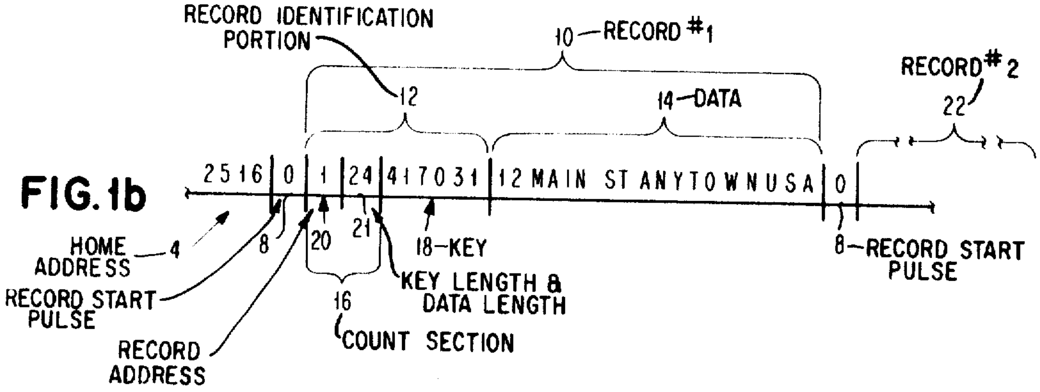
Figure 2:
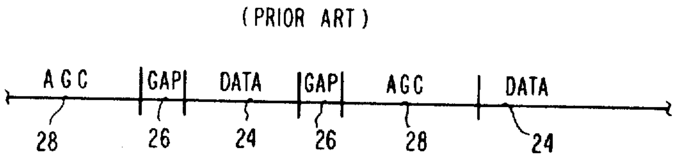
Figure 3:
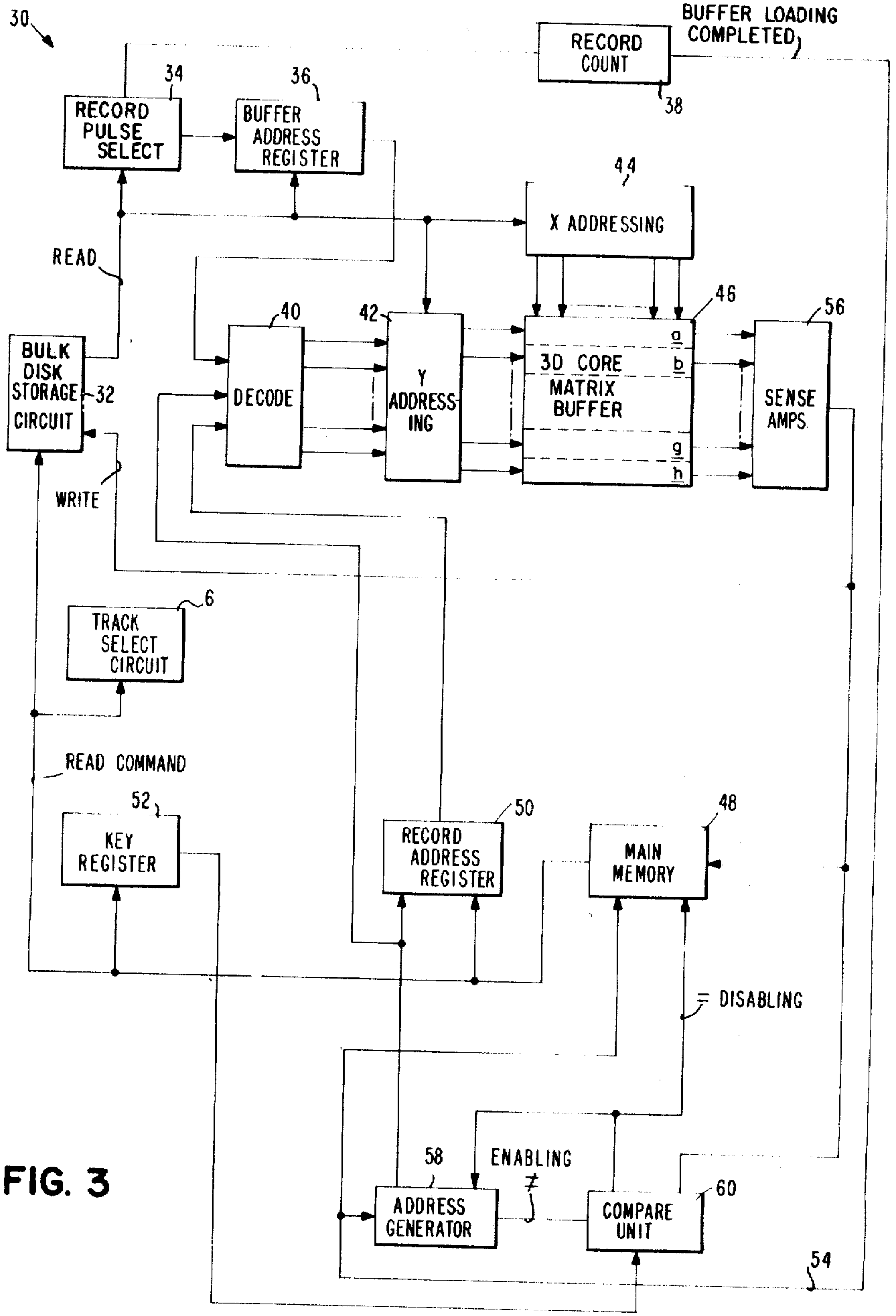

FIGS. 1*a* and 1*b* show the record format used in implementing the instant invention, FIG. 2 shows a prior art record format illustrating the various timing and control signals which are not required in a control unit which practices the instant invention; and FIG. 3 is a block diagram of a control unit embodying the instant invention.

FIGS. 1*a* and 1*b* show a schematic view of a single track 1 on the surface of a magnetic disc 2. A first portion 4 of the track 1 is employed to record the "home address" of each disc track. According to the well-known "cylinder" concept of record addressing, the home address comprises the cylinder number and the head number of each respective track. This "home address" is employed to verify the correct selection of a track made by a track selection mechanism 6 shown in FIG. 3. Immediately following the "home address" is a record start identifying signal 8, which signal may take any well-known configuration. For example, but not as a limitation, this signal 8 may be a single pulse, a series of pulses in a prearranged pattern or a gap. Whatever format the signal 8 takes, its function is to indicate the beginning of a record 10. The record 10 includes a record identification portion 12 and a data portion 14. In the preferred embodiment of the invention, the record identifying portion includes a count section 16 and a key section 18, which sections are described in more detail in an application entitled "Data Filing System," filed Mar. 25, 1964, Ser. No. 354,740 by J. R. Evans and assigned to the assignee of the present invention, U.S. Patent 3,299,410.

The count section 16 comprises at least a record address 20 in a predetermined portion of the count section 16. If the count section only comprises a record address, obviously it would not have the added requirement of being in a predetermined portion of that section. This record address 20 identifies each record on a track from every other record on the same track. Additionally, the count section 16 may include indicia 21 indicating the length of both the key section 18 and the data portion 14. The length could be expressed in elapsed rotational time or the actual number of bytes in both the key section 18 and the data portion 14.

For the purpose of this description, the record address 20 is the first byte in the count section 16. Each byte comprises eight binary bits and is capable of identifying two hundred records on a single track. If more records are located on a single track, additional bytes can easily be added to the record address 20. Normally, the length indicia 21 comprises two bytes each for the key section 18 and the data portion 14 respectively.

The key section 18 contains indicia which comprises an additional way of identifying each record. For example, the records may contain payroll information and the key section contains a man number. The quickest way to retrieve a record is to use the track address 4 and the record number 20 of the desired record. However, if these are not known, a search of the random access file can be performed by sequentially searching tracks for the information in the key section 18. The data portion 14 of the record 10 follows the key section 18, the record identifying signal 8 is intermediate the record 10 and the next successive record 22.

Additional records are added to the extent limited by the track capacity. For the purposes of this description, eight records are shown on the track 1.

In the prior art track format, shown in FIG. 2, successive areas of data 24 are separated by an intervening gap 26 and automatic gain control (AGC) signals 28. The gaps 26 are required to adjust the operating levels of associated circuits when changing between a read and write function on successive data areas. The AGC signals 28 are required to insure the reading of a record at the same level at which it was written. An inspection of FIG. 1 shows the absence of control signals typified by the gap 26 and the AGC signal 28 on a disc which is employed with a control unit practicing the instant invention. The above identified control signals are not inclusive of all the signals which are not now necessary, but are only illustrative. A further inspection of FIG. 1 shows that information signals are packed as closely together as the writing density of the medium permits, providing a maximum information signal storage capacity.

Referring to FIG. 3, there can be seen a block diagram of a file control circuit 30 embodying the instant invention. A bulk storage circuit 32 includes a plurality of discs on which a plurality of records are recorded in the format shown in FIG. 1. The circuit 32 operates in combination with a track select circuit 6 for moving magnetic read-write heads over the surface of the discs. A standard home address compare circuit, included in the circuit 6, verifies the placement of one of the magnetic heads over the correct track. These last mentioned circuits, along with others hereinafter mentioned by name only, are not completely described since they are well-known in the prior art.

As soon as the mechanical read-write heads are positioned over the mechanically selected track, the signals read from the track are applied to a record pulse select circuit 34 and a buffer address register 36. The first signal read by the magnetic head can be from any position in the track. For the purposes of this description, it is assumed that the magnetic head will come within reading range of the information stored on the track, half way through the record indicated by the numeral 10 in FIG. 1*a*. The record pulse select circuit 34 is employed to identify the record pulse 8 intermediate the records 10 and 22 and every other record pulse 8. The portion of the record 10 read prior to the location of the first record pulse 8 is not stored and this portion equals the minor rotational delay experienced by the circuit 30. Normally in prior art devices, reading cannot begin until the "home address" 4 has been verified. In the instance just mentioned the prior art devices would experience a rotational delay equal to a complete revolution. The output of the circuit 34 is applied to a record count circuit 38 which is employed to count the number of record pulses on a track. For the purposes of this description, eight such records are shown in FIG. 1. Therefore, when the count of eight is reached, all of the material from the selected track has been read therefrom.

The output from the circuit 34 is applied to the buffer address register 36 enabling the buffer address register to store the record address 20 read from the track. More specifically, the record pulse 8 prepares the register 36 to store the next signals applied thereto which represent the current record address. The register 36 provides a static source from which the address signals are applied to a decode circuit 40. The decode circuit 40 is of standard design and operates in conjunction with a Y addressing ring 42 and an X addressing ring 44, operating in a coincident current mode. Any addressing technique may be employed for storing records in identifiable portions of a core storage circuit 46. For example, a Y addressing technique may select successive horizontal rows in the core storage circuit 46 while the X addressing ring 44, operating at a much higher rate, addresses a single core in a row to store each data byte in a record. In this manner, a record will be written on each horizontal row of the core matrix 46. Each of the rows is identified by the letter *a* through *h* corresponding to the eight sections respectively. Since each byte of information comprises eight binary bits, the core matrix 46 includes eight planes of magnetic cores arranged in a manner well known in the prior art so that one byte of information is written in such a way as to appear extending into the figure.

Assuming that the record 22 is the first complete record read from the track 1, the decode circuit 40 positions the addressing ring 42 to inert data bits into the second horizontal row *b* in the core storage circuit 46. Successive records are stored in adjacent horizontal rows of a core matrix 46. For each record stored, the record total count maintained in the circuit 38 increases by one. When the records identified by *b* through *h* are stored in the core matrix 46, the magnetic read-write head traverses the home address area 4 of the selected track 1. While the home address is being read, the track select circuit 6 verifies the correct placement of the magnetic heads. Thereafter, the reading of the record pulse 8, associated with the record 10, positions the addressing circuitry so as to insert the record 10 into the *a* row of the core matrix 46.

When a data processor requires a record from the bulk storage circuit 32, the processor main memory 48 is accessed for control signals. These control signals are held in the program storage area of the processor. Two general record retrieval operations occur. In the first operation the control signals specify that a read operation is to take place by giving a read command to the circuit 32. The "home address" 4 and the record address 20 are also furnished by the processor. The second operation occurs when the record address is not known. The read command is given to the circuit 32 and the "home address" 4 is given to the circuit 6. Since the record address is unknown; the key information 18 of the record is furnished by the processor in substitution thereof. The record address of the described record is stored in a register 50, and the key information is stored in a register 52 in those cases where the record address is unknown. Thereafter, the sequential loading operation previously described is followed in loading the core matrix 46. Once all eight records have been loaded into the core matrix, the circuit 38 signals the main memory, by a line 54, that the loading operation is completed. At a later time, when the processor is free to receive the identified record, the main memory 48 sends an additional signal to the register 50 for transferring the record stored in the core matrix 46 to the memory 48. The address held in the register 50 is applied to the decode circuit 40, addressing the matrix 46 by the X and Y circuits 44 and 42 respectively. A scan of the horizontal row is achieved through a normal operation procedure of the X and Y circuits 44 and 42 respectively. A sense amplifier circuit 56 is responsive to the interrogated signals held in the matrix 46 and applies the interrogated signals to the main memory 48 which uses this record in its data processing operation. Once the record has been stored in the main memory 48, the entire contents of the core matrix 46 is again written on the same track by standard techniques.

During a search on key operation, the control circuit 30 reads an entire track into the core storage circuit 46 in the manner previously described. The key register 52 contains the key information for which the scan operation is searching, and the register 50 is empty. In response to the signal generated by the circuit 38 on the line 54, the address generator 58 applies the address of the first record to the decode circuit 40 and the register 50. Thereafter, the contents of the key portion of the first record is compared against the contents of the key register 52 in a compare unit 60. Each time the records fail to compare a not equal signal is applied to the address generator circuit 58, increasing the address which it generates by one. The increased address is again applied to the decode circuit 40 and the record address register 50. This procedure continues until an equal result is indicated by the compare unit 60. At this time, a disable signal is applied to the address generator 58 preventing any further address generation; and the equal signal is applied to the main memory 48 indicating that the desired record has been found. When the main memory 48 is ready to receive this record, it applies a transfer pulse to the record address register 50 which now contains the address of the desired record. In the same manner as previously described, the desired record is read from core matrix 46 into the main memory 48 and the contents of the core matrix 46 is transferred back to the interrogated track 1 in the bulk storage circuit.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In combination with a data processor operating in response to a stored program and a random access storage unit having a plurality of storage locations and means coupled to the random access storage unit for selecting a location in response to signals furnished by the data processor, a record retrieval control unit comprising, a memory unit having a plurality of addressable positions, each of the locations being employed for storing a plurality of records and each of said records having individual identifying indicia, and means responsive to respective identifying indicia from one of said locations for transferring said records from said one location to respective positions in said memory unit.

2. In combination with a data processor operating in response to a stored program and a random access storage unit having a plurality of storage locations and means coupled to the random access storage unit for selecting a location in response to signals furnished by the data processor, a record retrieval control unit comprising, a memory unit having a plurality of addressable positions, each of the locations being employed for storing a plurality of records and each of said records having individual identifying indicia, means responsive to respective identifying indicia from one of said locations for transferring said records from said one location to respective positions in said memory unit, and means responsive to the processor for storing the identifying indicia of a particular record and coupled to said transfer means for selecting the identified record from its respective position in said memory unit and rendering it available to the data processor.

3. In combination with a data processor operating in response to a stored program and a random access storage unit having a plurality of storage locations and equipped with means for selecting a location in response to signals furnished by the data processor, a record retrieval control unit comprising, a memory unit having a plurality of addressable positions, each of the locations being employed for storing a plurality of records and each of said records having address indicia for identifying each record in one of said locations and key indicia for identifying the record itself, means responsive to respective address indicia from one of said locations for transferring said records from said one location to respective positions in said memory unit, and means responsive to the processor for storing an address indicia of a particular record and coupled to said transfer means for selecting the identified record from its respective position in said memory unit and rendering it available to the data processor.

4. In combination with a data processor operating in response to a stored program and a random access storage unit having a plurality of storage locations and equipped with means for selecting a location in response to signals furnished by the data processor, a record retrieval control unit comprising, a memory unit having a plurality of addressable positions, each of the locations being employed for storing a plurality of records and each of said records having address indicia for identifying each record in one of said locations and key indicia for identifying the record itself, means responsive to respective address indicia from one of said locations for transferring said records from said one location to respective positions in said memory unit, means responsive to the processor for storing an address indicia of a particular record and coupled to said transfer means for selecting the identified record from its respective position in said memory unit and rendering it available to the data processor, and means coupled to the memory unit for returning said non-identified records to their respective positions from said one location identified by the signals furnished by the data processor.

5. In combination with a programmed data processor and a random access storage unit having a plurality of storage locations and means coupled to the random access storage unit for selecting each location in response to signals furnished by the data processor, a record retrieval control circuit comprising, a memory unit having a plurality of addressable positions, each of the locations being employed for storing a plurality of records and each of said records having individual identifying indicia, means responsive to respective identifying indicia from one of said locations for transferring said records from said location to respective positions in said memory unit, means responsive to said transfer means for signaling the data processor that said records from said one location are stored in said memory unit, and means responsive to the processor for storing the identifying indicia of a particular record and coupled to said transfer means for selecting the identified record from its respective position in said memory unit and for rendering it available to the data processor.

6. In combination with a data processor operating in response to a stored program and a random access storage unit having a plurality of storage locations and equipped with means for selecting a location in response to signals furnished by the data processor, a record retrieval control unit comprising, a memory unit having a plurality of addressable positions, each of the locations being employed for storing a plurality of records and each of said records having address indicia for identifying each record in one of said locations and key indicia for identifying the record itself, means responsive to respective address indicia from one of said locations for transferring said records from said one location to respective positions in said memory unit, means responsive to the processor for storing a particular key signal, and means for searching said plurality of positions for the particular key signal and for rendering the record containing the particular key signal available to the data processor.

7. In combination with a data processor operating in response to a stored program and a random access storage unit having a plurality of storage locations and equipped with means for selecting a location in response to signals furnished by the data processor, a record retrieval control unit comprising, a memory unit having a plurality of addressable positions, each of the locations being employed for storing a plurality of records and each of said records having address indicia for identifying each record in one of said locations and key indicia for identifying the record itself, means responsive to respective address indicia from one of said locations for transferring said records from said one location to respective positions in said memory unit, means responsive to the processor for storing a particular key signal, means for searching said plurality of positions for the particular key signal and for rendering the record containing the particular key signal available to the data processor, and means coupled to said memory unit for returning said records not containing the particular key signal from said one location selected in response to signals furnished by the data processor.

8. In combination with a programmed data processor and a random access storage unit having a plurality of storage locations and means coupled to the random access storage unit for selecting a desired location in response to signals furnished by the data processor, a record retrieval control unit comprising, a memory unit having a plurality of addressable positions, each of the locations being employed for storing a plurality of records and each of said records having address indicia for identifying each record in one of said locations and key indicia for identifying the record itself, means responsive to respective address indicia from one of said locations for transferring said records from said one location to respective positions in said memory unit, means responsive to the processor for storing a particular key signal, means for searching said plurality of positions for the particular key signal, and means responsive to said searching means for locating a desired record corresponding to said particular key signal and for signaling the data processor upon the location of the record containing the particular key indicia, said searching means and said transfer means being responsive to the data processor for rendering said located record available to the data processor.

9. In combination with a programmed data processor and a random access storage unit having a plurality of storage locations and means coupled to the random access storage unit for selecting each location in response to signals furnished by the data processor, a record retrieval control circuit comprising, a memory unit having a plurality of addressable positions, each of the locations being employed for storing a plurality of records and each of said records having individual identifying indicia, means responsive to respective identifying indicia from one of said locations for transferring said records from said one location to respective positions in said memory unit, means responsive to said transfer means for signaling the data processor that said records from said location are stored in said memory unit, means responsive to the processor for storing the identifying indicia of a particular record and coupled to said transfer means for selecting the identified record from its respective position in said memory unit and for rendering it available to the data processor, and means for returning said records in said memory unit to said random access storage unit.

10. In combination with a data processor operating in response to a stored program and a random access storage unit having a plurality of storage locations and equipped with means for selecting a location in response to signals furnished by the data processor, a record retrieval control unit comprising, a memory unit having a plurality of addressable positions, each of the locations being employed for storing a plurality of records and each of said records having address indicia for identifying each record in one of said locations and key indicia for identifying the record itself, means responsive to respective address indicia from one of said locations for transferring said records from said one location to respective positions in said memory unit, means responsive to the processor for storing a particular key signal, means for searching said plurality of positions for the particular key signal and for recovering the address indicia of the record containing the particular key signal, and means responsive to said searching and recovering means for storing said recovered address indicia and coupled to said transfer means for rendering the record addressed by said recovered address indicia available to the data processor.

11. In combination with a data processor operating in response to a stored program and a random access storage unit having a plurality of storage locations and equipped with means for selecting a location in response to signals furnished by the data processor, a record retrieval control unit comprising, a memory unit having a plurality of addressable positions, each of the locations being employed for storing a plurality of records and each of said records having address indicia for identifying each record in one of said locations and key indicia for identifying the record itself, means responsive to respective address indicia from one of said locations for transferring said records from said one location to respective positions in said memory unit, means responsive to the processor for storing a particular key signal, means for searching said plurality of positions for the particular key signal and for recovering the address indicia of the record containing the particular key signal, means responsive to said searching and recovering means for storing said recovered address indicia and coupled to said transfer means for rendering the record addressed by said recovered address indicia available to the data processor, and means coupled to said memory unit for returning said records remaining in said memory unit from said one location identified by the signals furnished by the data processor.

12. In combination with a programmed data processor and a random access storage unit having a plurality of storage locations and equipped with means for selecting a location in response to signals furnished by the data processor, a record retrieval control circuit comprising, a memory unit having a plurality of addressable positions, each of the locations being employed for storing a plurality of records and each of said records having indicia for identifying each record in one of said locations and key indicia for identifying the record itself, input means for receiving successive records from the storage unit, means coupled to said input means and responsive to respective address indicia from one of said locations for transferring said records from said one location to respective positions in said memory unit, means responsive to the processor for storing a particular key signal, means for searching said plurality of positions for the particular key signal, means included in said searching means for recovering the address indicia of the record containing the particular key signal, means for signaling the data processor that the particular record has been identified, and said recovering means being responsive to the data processor for rendering the particular record available to the data processor.

13. In combination with a programmed data processor and a random access storage unit having a plurality of storage locations and equipped with means for selecting a location in response to signals furnished by the data processor, a record retrieval control circuit comprising, a memory unit having a plurality of addressable positions, each of the locations being employed for storing a plurality of records and each of said records having indicia for identifying each record in one of said locations and key indicia for identifying the record itself, input means for receiving successive records from the storage unit, means coupled to said input means and responsive to respective address indicia from one of said locations for transferring said records from said one location to respective positions in said memory unit, means responsive to the processor for storing a particular key signal, means for searching said plurality of positions for the particular key signal, means included in said searching means for recovering the address indicia of the record containing the particular key signal, means for signaling the data processor that the particular record has been identified, said recovering means being responsive to the data processor for rendering the particular record available to the data processor, and means coupled to said memory unit for returning said records remaining in said memory unit from said one location in the storage unit identified by the data processor.

14. In combination with a data processor operating in response to a stored program and a random access storage unit having a plurality of storage locations and equipped with means for selecting a location in response to signals furnished by the data processor, a record retrieval control unit comprising, a memory unit having a plurality of addressable positions, each of the locations being employed to store a plurality of records and each of said records having address indicia for identifying each record in one of said locations and key indicia for identifying the record itself, means responsive to respective address indicia read from one of said locations for transferring said records from said last mentioned location to respective positions in said memory unit, means responsive to the processor for storing a particular key signal, address generation means coupled to said transfer means for reading each of said records from successive positions of said memory unit, means responsive to said address generation means and to said key storage means for locating the particular record containing the particular key signal, storage means responsive to said address generation means for recovering the address indicia of the particular record containing the particular key signal, and means responsive to the location of the particular key signal and coupled to said address indicia storage means for rendering the record identified by said key signal available to said data processor.

15. In combination with a data processor operating in response to a stored program and a random access storage unit having a plurailty of storage locations and equipped with means for selecting a location in response to signals furnished by the data processor, a record retrieval control unit comprising, a memory unit having a plurality of addressable positions, each of the locations being employed to store a plurality of records and each of said records having address indicia for identifying each record in one of said locations and key indicia for identifying the record itself, means responsive to respective indicia read from one of said locations for transferring said records from said last mentioned location to respective positions in said memory unit, means responsive to the processor for storing a particular key signal, address generation means coupled to said transfer means for reading each of said records from successive positions of said memory unit, means responsive to said address generation means and to said key storage means for locating the particular record containing the particular key signal, storage means responsive to said address generation means for recovering the address indicia of the particular record containing the particular key signal, and means responsive to the location of the particular key signal and coupled to said address indicia storage means for rendering the record identified by said key signal available to said data processor, and means coupled to said memory unit for returning all remaining records to the location in the random access storage unit identified by the signals furnished by the data processor.

16. In combination with a programmed data processor and a random access storage unit including a plurality of magnetic surfaces on which a plurality of storage tracks are located, each track including a track address and a plurality of records having a start of record pulse at the beginning of each record and a record address, and means for locating a predetermined track in response to said stored program, a control unit comprising, means for identifying each record by its start of record pulse, a memory circuit having a plurality of separately addressable positions, a decode circuit triggered by said identifying means and responsive to a record address for selecting a corresponding storage position in said memory circuit and for sequentially transferring the entire contents of a track into corresponding positions, means responsive to said data processor for storing the identifying indicia of the desired record.

means for sequentially comparing said identifying indicia with each record in said storage positions, means for signaling the processing machine when the desired record is located, and means responsive to said data processor for transferring said desired message to the processor.

17. In combination with a programmed data processor, a random access storage unit including a plurality of magnetic surfaces on which a plurality of storage tracks are located, each track including a track address and a plurality of records, each record having a start of record pulse at the beginning of each record and a record address, and means for locating a predetermined track in response to said stored program, a record retrieval control unit comprising, means responsive to the start of record signal for identifying the location of each record address, a memory circuit having a plurality of separately addressable storage positions into which an equal plurality of records is stored, a decode circuit triggered by said identifying means and responsive to a record address for selecting a corresponding storage position in said memory circuit and for sequentially transferring the entire contents of a track into its respective storage positions, means responsive to the data processor for storing the identifying indicia of the desired record number, said indicia being employed for indicating the sector location of a track at which a record is located, means for signaling the processor when the contents of an entire track is stored in said storage means, and means responsive to an unload signal generated by the processing unit for transferring said stored identifying indicia to said decode circuit, whereby the selected record can be transferred to the programmed data processor.

18. In combination with a programmed data processor and a storage unit including a plurality of magnetic surfaces on which a plurality of storage tracks are located, each track including a plurality of random length records having a start of record signal, an address for identifying each record in a track, a key field for providing a second means for identifying each record in a storage unit and a data field for storing data characters, and means for locating a predetermined track in response to said stored program, a second retrieval control unit comprising, means responsive to the start of record signal for identifying the location of each record address, a memory circuit having a plurality of separately addressable storage positions into which an equal plurality of records is stored, each position being equipped to store the largest record stored on a track, a decode circuit triggered by said identifying means and responsive to a record address for selecting a corresponding storage position in said memory circuit and for sequentially transferring the entire contents of a track into its respective storage positions, means responsive to the data processor for storing the record address of the desired record, means for signaling the processor when the contents of an entire track is stored in said storage means, and said address storage means being responsive to a control signal from the processing unit for transferring said stored record address to said decode circuit, whereby the desired record can be transferred to the programmed data processor.

19. In combination with a programmed data processor and a random access storage unit including a plurality of magnetic surfaces on which a plurality of storage tracks are located, each track including a plurality of random length records having a start of record signal, an address for identifying each record in a track, a key field for providing a second means for identifying each record in a storage unit and a data field for storing data characters, and means for locating a predetermined track in response to the stored program, a record retrieval control unit comprising, input means coupled to the storage unit for successively receiving a plurality of records and responsive to the start of record signals for identifying the location of each record address, a memory circuit having a plurality of separately addressable storage positions into which an equal plurality of records is stored, each position being equipped to store the longest record stored on a track, a decode circuit coupled to said input means and responsive to a record address for selecting a corresponding storage position in said memory circuit and for sequentially transferring each of said remaining plurality of records to a respective storage position, means responsive to the data processor for storing the particular key signals identifying a particular record, means including address generating means for searching each record stored in said memory circuit for the key signals stored in said key signal storage means, address storage means coupled to said address generating means for storing a single record address corresponding to the record presently being searched, means responsive to the location of said particular key signal for disabling said address generating means and for signaling the data processor of a successful key search, and said address storage means being responsive to a control signal from the data processor for effecting the transfer of said particular record to the data processor.

20. In combination with a programmed data processor and a random access storage unit including a plurality of magnetic surfaces on which a plurality of storage tracks are located, each track including a plurality of random length records having a start of record signal, an address for identifying each record in a track, a key field for providing a second means for identifying each record in a storage unit and a data field for storing data characters, and means for locating a predetermined track in response to the stored program, a record retrieval control unit comprising, input means coupled to the storage unit for successively receiving a plurality of records and responsive to the start of record signals for identifying the location of each record address, a memory circuit having a plurality of separately addressable storage positions into which an equal plurality of records is stored, each position being equipped to store the longest record stored on a track, a decode circuit coupled to said input means and responsive to a record address for selecting a corresponding storage position in said memory circuit and for sequentially transferring each of said remaining plurality of records to respective storage positions, means responsive to the data processor for storing the particular key signals identifying a particular record, means including address generating means for searching each record stored in said memory circuit for the key signals stored in said key signal storage means, address storage means coupled to said address generating means for storing a single record address corresponding to the record presently being searched, means responsive to the location of said particular key signal for disabling said address generating means and for signaling the data processor of a successful key search, said address storage means being responsive to a control signal from the data processor for effecting the transfer of said particular record to the data processor, and means coupled to the memory unit for returning said non-identified records to their respective positions in said location identified by the signals furnished by the data processor.

References Cited

UNITED STATES PATENTS

| | | | |
|---|---|---|---|
| 2,969,525 | 1/1961 | Hill | 340—172.5 |
| 3,019,422 | 1/1962 | Eachus | 340—172.5 |
| 3,085,230 | 4/1963 | Shoultes et al. | 340—172.5 |
| 3,208,057 | 9/1965 | Applequist et al. | 340—174.1 |
| 3,309,676 | 3/1967 | Hickey | 340—172.5 |
| 3,312,948 | 4/1967 | Capozzi | 340—172.5 |

OTHER REFERENCES

West, R. L.: Data Transfer With Dynamic Priority Determination, in IBM Technical Disclosure Bulletin, 2(4), pp. 36–38, December 1959.

PAUL J. HENON, *Primary Examiner.*

J. VANDENBURG, *Assistant Examiner.*